United States Patent
Chang et al.

(10) Patent No.: US 9,030,178 B2
(45) Date of Patent: May 12, 2015

(54) CURRENT CONTROL CIRCUIT AND METHOD THEREOF FOR A POWER CONVERTER

(71) Applicant: Luxmill Electronic Co., Ltd, Zhudong Township, Hsinchu County (TW)

(72) Inventors: Yu-Cheng Chang, Taipei (TW); Mao-feng Lan, Hsinchu (TW); Chung-hung Lin, Huwei Township, Yunlin County (TW)

(73) Assignee: Luxmill Electronic Co., Ltd., Zhudong Township, Hsinchu County (TW)

( * ) Notice: Subject to any disclaimer, the term of this patent is extended or adjusted under 35 U.S.C. 154(b) by 79 days.

(21) Appl. No.: 14/010,041

(22) Filed: Aug. 26, 2013

(65) Prior Publication Data

US 2014/0119076 A1   May 1, 2014

(30) Foreign Application Priority Data

Nov. 1, 2012 (TW) .............................. 101140487 A

(51) Int. Cl.
| | |
|---|---|
| *H02M 1/36* | (2007.01) |
| *H02M 3/156* | (2006.01) |
| *H02M 3/157* | (2006.01) |
| *H02M 3/158* | (2006.01) |
| *H02M 1/00* | (2006.01) |

(52) U.S. Cl.
CPC ................ *H02M 1/36* (2013.01); *H02M 3/158* (2013.01); *H02M 2001/009* (2013.01)

(58) Field of Classification Search
CPC ........ G05F 1/573–1/575; H02M 3/156–3/158; H02M 1/36; H02M 2001/0009
USPC .......................... 363/276, 280, 282–285, 351
See application file for complete search history.

(56) References Cited

U.S. PATENT DOCUMENTS

| | | | | |
|---|---|---|---|---|
| 2007/0114985 | A1* | 5/2007 | Latham et al. | 323/283 |
| 2009/0195231 | A1* | 8/2009 | Noon et al. | 323/282 |
| 2011/0316508 | A1* | 12/2011 | Cheng et al. | 323/282 |

* cited by examiner

*Primary Examiner* — Timothy J Dole
*Assistant Examiner* — Sisay G Tiku
(74) *Attorney, Agent, or Firm* — Muncy, Geissler, Olds & Lowe, P.C.

(57) ABSTRACT

A power converter used in the current control circuit and control method, consisting of a converter, a voltage divider circuit, a current sampling circuit, a first gain circuit, a differential amplifier, a second gain circuit, a multiplier, a saw tooth wave generator, a modulation comparator, and a driver. The invention samples inductor current through the current sampling circuit and generates the current sense signal, then processes again. With the differential amplifier, it compares the feedback voltage from the voltage divider circuit with the reference voltage, and the results along a modulation comparator output a drive signal to control the duty cycle in order to avoid the generation of inrush current. The present invention avoids inrush current caused by the large drive signal and achieves a good response rate and better system stability.

16 Claims, 11 Drawing Sheets

CURRENT CONTROL CIRCUIT AND METHOD THEREOF FOR A POWER CONVERTER

BACKGROUND OF THE INVENTION

1. Field of the Invention

The present invention is related to a current circuit and method thereof and more particularly related to a current control circuit and method thereof for a power converter, which implements a current sampling circuit to sample an inductor current passing through the current control circuit of the power converter so as to be able to control the output duty cycle ratio. As a result, the occurrence of inrush current is restrained. The present invention provides a better response speed and better system stability.

2. Description of the Prior Art

Because of continuing development of the modern technology and the popularity of the electronic devices, power converters play an important role to the electronic devices. A power converter is to convert power to suitable voltage as needed by the electronic devices, such as computers, display monitors, DVD players, and so on.

FIG. 1 is a view illustrating a conventional power converter. The control circuit 100 includes a converter unit 101, a voltage divider circuit 102, a differential amplifier 103, a comparator 104, a compensation circuit 105 and a driver 106. An input power $V_i$ is converted by the converter unit 101 to generate a output power $V_0$ to a capacitance C. The converter unit 101 includes an inductor, a diode and a transistor switch. During operation, as the transistor switch is conducted, the diode will have a reverse bias to store the power of the input voltage $V_i$ in the inductor. When the transistor switch is cut off, the inductor will be unable to store power and the power stored in the inductor will be released to the capacitance C.

The output voltage $V_0$ will generate a feedback voltage $V_{FB}$ by passing the voltage of the resistor $R_1$ and resistor $R_2$, which are connected in serial, in the voltage divider circuit 102 to compare in the differential amplifier 103 with a reference voltage $V_{ref}$ to generate an error signal $E_0$ to the comparator 104. However, it is easy to cause circuit unstable because of the effect of the loading variation. Therefore, a compensation circuit 105 is used to solve the problem of the circuit stability. At the same time, the inductor current within the converter unit 101 and a ramp signal will be weighted to generate an output signal $V_{sum}$. Thereafter, the comparator 104 will compare the error signal $E_0$ and the output signal to generate a driving signal S' and then the driver 106 will drive the transistor switch SW to operate.

However, the conventional power converter is likely to generate an inrush current which causes the circuit to malfunction and decreases the circuit efficiency. Therefore, it is necessary to design a power converter to solve the problem caused by the inrush current and to increase system efficiency.

The present invention is related to a current circuit and method, more particularly related to a current control circuit and method for a power converter. The invention implements a current sampling circuit to sample an inductor current passing through the current control circuit of the power converter so as to be able to control the output duty cycle ratio. As a result the occurrence of inrush current is restrained. The present invention thus provides a better response speed and better system stability.

SUMMARY OF THE INVENTION

In order to solve the problem aforementioned, the main objective of the present invention is to provide a current control circuit for a power converter. The circuit samples an inductor current passing the inductor in a current sampling circuit. The magnitude of the inductor current that is sampled is then modified by a gain factor and input to a modulation comparator for comparison with the ramp signal generated by the saw tooth wave generator. Finally, a drive signal is output and used to control the output duty cycle ratio. By utilizing the duty cycle ratio, it is able to control the occurrence of inrush current. The present invention thus obtains a better response speed and better system stability.

Another objective of the present invention is to provide a current control method for a converter. By implementing the current control method the invention implements a current sampling circuit to sample an inductor current passing through the current control circuit of the power converter so as to be able to control the output duty cycle ratio. As a result the occurrence of inrush current is restrained. The present invention thus provides a better response speed and better system stability.

According to the objectives described above, the present invention provides a current control circuit for a power converter, comprising: a converter including at least one inductance and at least one switch and configure to receive an input voltage and generate a output voltage to a capacitance; a voltage divider circuit electrically connected to the capacitance and generating a feedback voltage in accordance with the output voltage of the converter; a current sampling circuit electrically connected to the converter and configure to generate a current detecting signal in accordance with the inductor current of the inductor of the converter; a first gain circuit configure to multiply the current detecting signal by a first gain adjusting parameter to generate a first signal; a differential amplifier with one end receiving a reference voltage and the other end electrically connected to the feedback voltage so as to output an error signal by comparing the reference voltage and the feedback voltage; a second gain circuit configure to multiply the error signal by a second gain adjusting parameter to generate a second signal; a multiplier by weighting the first signal, the second signal and the feedback voltage to generate a third signal; a saw tooth wave generator configure to provide a ramp signal; a modulation comparator comparing the third signal and the ramp signal to generate a driving signal; and a driver including one end to receive the driving signal and the other end electrically coupling to a switch within the converter and configure to generate a duty cycle ratio to control the switch.

The present invention provides a current control method of a current control circuit used in a power converter. The current control circuit including a converter, a voltage dividing circuit, a current sampling circuit, a differential amplifier, a modulation comparator, and a driver connected to the modulation comparator. The current control method comprising steps of: receiving an input voltage and transforming it to an output voltage by the converter; generating a feedback voltage in accordance with the output voltage of the converter by the voltage dividing circuit; generating an error signal by calculating a difference between the feedback voltage and a reference voltage by the differential amplifier; using a current sample circuit to sample an inductor current passing on a inductor within the converter and using a differential amplifier to calculate a difference between the present inductor current on the inductor and the previous inductor current on the inductor or the average of the past inductor current on the inductor to output a current detecting signal; multiplying the error signal and the current inductance signal respectively by gain adjusting parameters and then weighting output results after adjusting with the feedback voltage to generate a output signal; comparing the output signal with a ramp signal of a saw tooth wave generator by the modulation comparator; and generating a duty cycle ratio by inputting a driving signal generated by the modulation comparator to a driver in order to control a switch within the converter.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention is to disclose a current control circuit and method for a power converter. The converter of the control circuit is to receive an input voltage and generate an output voltage. The output voltage is passing the voltage divider circuit to generate a feedback voltage. The current sampling circuit is to sample the inductor current of the converter to generate a current sensing signal. The feedback voltage of the voltage divider circuit is compared with a reference voltage and the result is weighted with the result of the gain process of the current sensing signal and the ramp signal of the saw tooth wave generator to input to the modulation comparator to compare so as to output a driving signal to control the duty cycle ratio and prevent the generation of the inrush voltage. The basic theory and the function of the current control circuit are well known in the art. So the following detail description is only focus on the characteristic of the current control circuit and method for the power converter. The detailed description of the present invention will be discussed in the following embodiments, which are not intended to limit the scope of the present invention, but can be adapted for other applications. While drawings are illustrated in details, it is appreciated that the quantity of the disclosed components may be greater or less than that disclosed, except expressly restricting the amount of the components.

Figure 1:
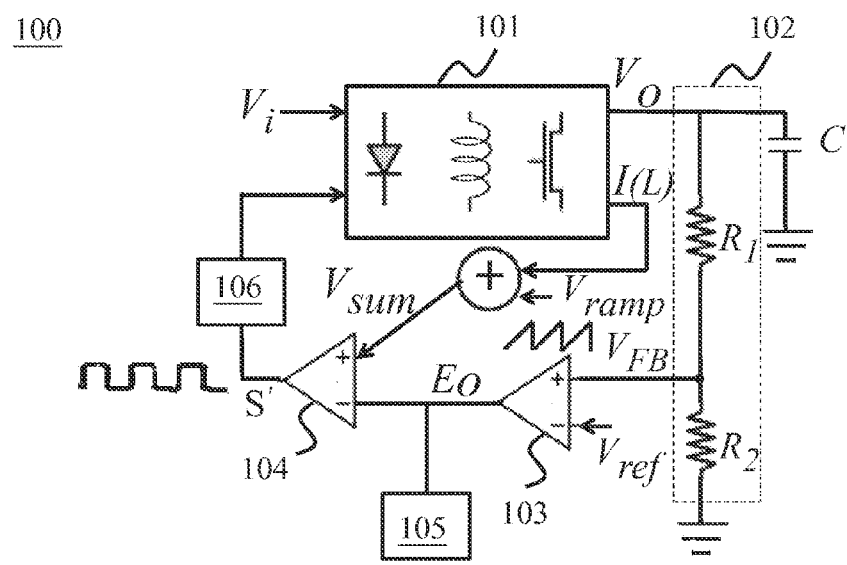
FIG. 1 is a view illustrating a conventional power converter.
Figure 2:
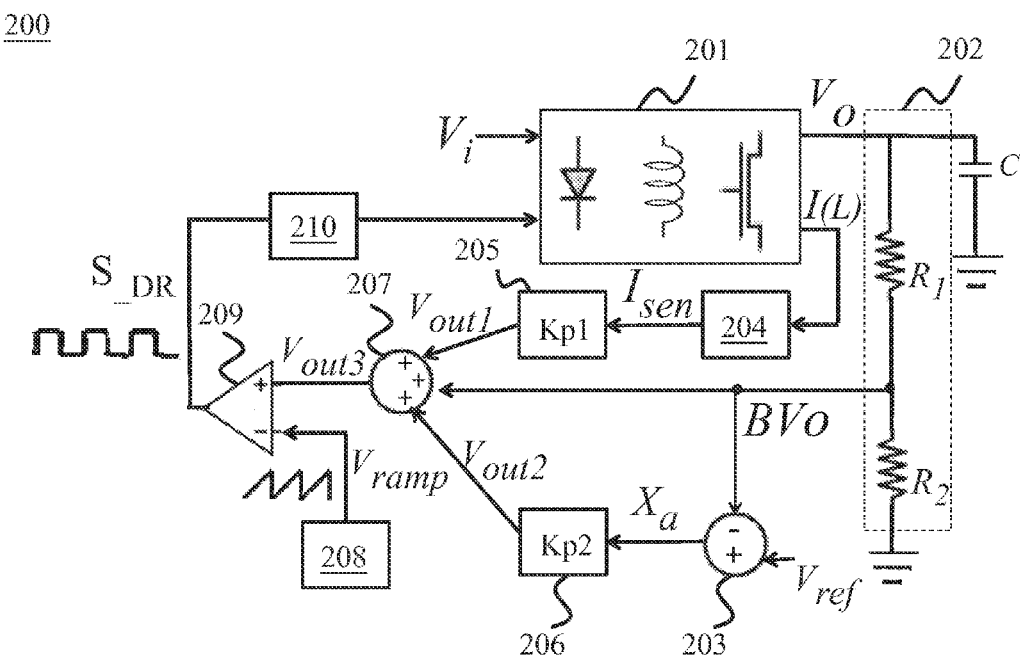
FIG. 2 is a structural view illustrating a current control circuit in the present invention.

First of all, please refer to FIG. 2, which is a structural view illustrating a current control circuit in the present invention. As shown in FIG. 2, the current control circuit 200 includes a converter 201. The converter 201 includes at least one inductor and at least one switch and is configured to receive an input voltage $V_i$ and generate a output voltage $V_0$ to a capacitance C. The converter further includes a diode and it can design any different type of the converter with different functions in accordance with the assembly of any combinations with the inductor, the diode or switch. The converter 201 can be a Boost converter, a Buck converter, a Boost-Buck converter or any other different types of converter (such as cuk converter). The voltage divider circuit 202 is electrically connected to the capacitance C and generating a feedback voltage $BV_0$ in accordance with the output voltage $V_0$ of the converter (where $B=R_2/(R_1+R_2)$). The voltage divider circuit 202 includes a first resistor electrically connected to the output voltage $V_0$ and a second resistor electrically connected between the first resistor and a ground. A connective point between the first resistor and the second resistor is electrically connected to a differential amplifier 203. The feedback voltage $BV_0$ is obtained from the connective point between the first resistor and the second resistor. The current sampling circuit 204 is electrically connected to the converter 201 and a current detective unit (not shown in FIG. 2) is configured to sample the inductor current of the converter and the current sampling circuit 204 will generate a current detecting signal $I_{sen}$. The current sensing unit can sample the inductor current of the converter by a series resistor, a resistor and capacitance filter, a sensing resistor, a conductive resistor or a sensing transistor. The current sampling circuit 204 further includes a memory unit (not shown in FIG. 2) configured to memorize an inductor current of the previous inductor current of the converter or the average of the past inductor current. The differential amplifier (not shown in FIG. 2) implements the current inductor current of the converter as an input and the output of the memory unit as another input to output a difference there between. The difference as the output is the current detective signal $I_{sen}$. The current sampling circuit 204 can be an analog to digital converter, an integrator, a resistor and capacitance filter and combination thereof. The first gain circuit 205 is to multiply the current detective signal $I_{sen}$ by a first gain adjusting parameter ($K_{p1}$) to generate a first signal $V_{out1}$ ($V_{out1}=K_{p1}*I_{sen}$, wherein * represents multiply). The differential amplifier 203 includes one end receiving a reference voltage $V_{ref}$ and the other end is electrically connected to the feedback voltage $BV_0$ to generate an error signal by comparing the reference voltage $V_{ref}$ and the feedback voltage $BV_0$. The second gain circuit 206 is configured to multiply the error signal $X_a$ by a second gain adjusting parameter $K_{p2}$ to generate a second signal $V_{out2}$ ($V_{out2}=K_{p2}*X_a$, wherein * represents multiply). The adder 207 is configured to weight the first signal $V_{out1}$, the second signal $V_{out2}$ and the feedback voltage $BV_0$ to generate a $V_{out3}$ ($V_{out3}=K_{p1}*I_{sen}+K_{p2}*X_a+BV_0$, wherein * represents multiply.) The saw tooth wave generator 208 is configured to provide a ramp signal $V_{ramp}$. The inductor current of the inductor sampled by the current sampling circuit 204 is calculated to generate the current detective signal $I_{sen}$ which is easy to cause sub-harmonic. Therefore, the ramp signal $V_{ramp}$ is added to solve the sub-harmonic problem. The modulation comparator 209 is configured to compare the third signal $V_{out3}$ and the ramp signal $V_{ramp}$ to generate a driving signal $S_{\_DR}$. The driver 210 includes one end receiving driving signal $S_{\_DR}$ and another end electrically connected to the switch of the converter. The converter can be a MOS transistor, a BJT transistor, an IGBT transistor or any other different kinds of transistors to receive the driving signal from the gate electrode.

Figure 3:
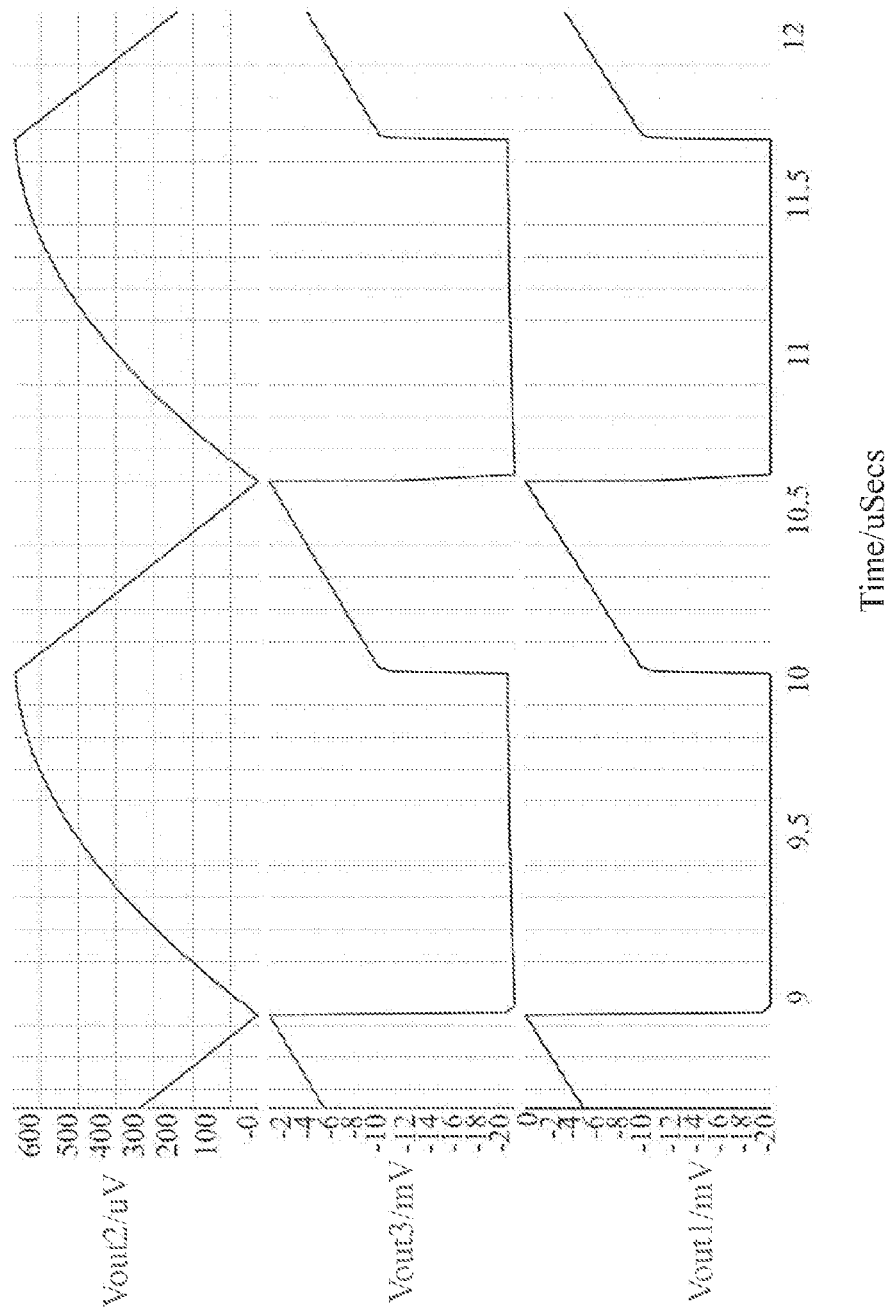
FIG. 3 is a waver diagram of the current control circuit in the present invention.

Now, please refer to FIG. 2 and FIG. 3 in conjunction, FIG. 3 is a wave diagram of the current control circuit in the present invention. When the switch W of the current control signal 200 is conducted, the power of the input voltage $V_i$ is stored in the inductor and the inductor current of the inductor is increased. Then, the current sampling circuit 204 samples the inductor current of the inductor and the differential amplifier within the current sampling circuit calculates the difference between the current inductor current of the inductor and the previous inductor current of the memory unit or the average of the past inductor current of the inductor. The difference as the output is the current detective signal $I_{sen}$. Thereafter, the current detective signal $I_{sen}$ is multiplied by a first gain adjusting parameter ($K_{p1}$) to generate a first signal $V_{out1}$ and the first gain adjusting parameter ($K_{p1}$) is a gain value less than 0. Therefore, the value $V_{out1}$ will be less than 0 (as the view of $V_{out1}$ in FIG. 3). It should be noted that the first gain adjusting parameter ($K_{p1}$) in the present embodiment is less than 0, but the first gain adjusting parameter ($K_{p1}$) is not limited to be a gain less than 0 and the value $V_{out1}$ is not limited to be less than 0. The output voltage $V_0$ will pass the first resistor and the second resistor of the voltage divider circuit 202 to generate a feedback voltage $BV_0$ (where $B=R_2/(R_1+R_2)$). The feedback voltage $BV_0$ is compared in the differential amplifier 203 and the reference voltage $V_{ref}$ to generate an error signal $X_a$. The error signal $X_a$ is multiplied by a second gain adjusting parameter ($K_{p2}$) to generate a second signal $V_{out2}$. The second gain adjust parameter ($K_{p2}$) is greater than 0 but less than 1 and the $V_{out2}$ value is greater than 0 but less than 1 (as the view $V_{out2}$ in FIG. 3). It should be noted that the second gain adjusting parameter ($K_{p2}$) is greater than 0 but less than 1 in the present embodiment, but the second gain adjusting parameter ($K_{p2}$) is not limited to be greater than 0 but less than 1 and the $V_{out2}$ value is not limited to be greater than 0 but less than 1. Now, the first signal $V_{out1}$ and the second signal $V_{out2}$ are weighted by the adder 207 and the feedback voltage $BV_0$ to generate a third signal $V_{out3}$ (as the view $V_{out3}$ in FIG. 3). At final, the modulation comparator 209 is used to compare the third signal $V_{out3}$ and a ramp signal provided by a saw tooth wave generator 208 to generate a driving signal $S\_{DR}$ and the driving signal $S\_{DR}$ is transmitted to the driver 210 to generate a duty cycle ratio to control conducting or cutting off in the switch of the converter.

Figure 4:
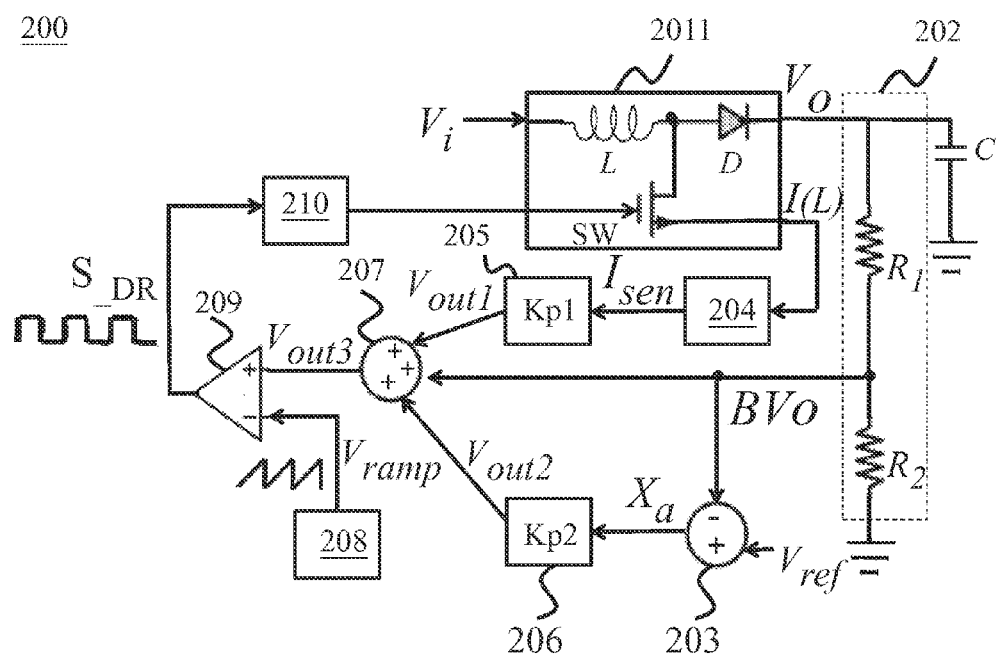
FIG. 4 is a structural view illustrating the current control circuit in a first embodiment of the present invention.

Now, please refer to FIG. 4, which is a structural view illustrating the current control circuit in a first embodiment of the present invention. As shown in FIG. 4, the current control circuit 200 includes a Boost converter 2011, a voltage divider circuit 202, a differential amplifier 203, a current sampling circuit 204, a first gain circuit 205, a second gain circuit 206, an adder 207, a saw tooth generator 208, a modulation comparator 209 and a driver 210. The Boost converter 2011 consists of an inductor L, a diode D, and a switch and configure to receive and convert an input voltage $V_i$ to generate an output voltage $V_0$ to a capacitance C. A voltage divider circuit 202 is electrically connected to the capacitance C and generates a feedback voltage $BV_0$ (where $B=R_2/(R_1+R_2)$) in accordance with the output voltage of the converter. The voltage divider circuit 202 includes a first resistor $R_1$ electrically connected to the output voltage $V_0$ and a second resistor $R_2$ electrically connected between the first resistor and a ground. A connective point between the first resistor $R_1$ and the second resistor $R_2$ is electrically connected to a differential amplifier 203. The feedback voltage $BV_0$ is obtained from the connective point between the first resistor and the second resistor. The current sampling circuit 204 implementing a current detective unit (not shown in FIG. 4) to sample the inductor current of the converter and the current sampling circuit 204 will generate a current detecting signal $I_{sen}$ after internal calculating. The current sensing unit can sample the inductor current of the converter in accordance with a series resistor, a resistor and capacitance filter, a sensing resistor, a conductive resistor or a sensing transistor. The current sampling circuit 204 further includes a memory unit (not shown in FIG. 4) configure to memorize the previous inductor current passing the inductor of the converter or the average of the past inductor current of the inductor. The differential amplifier (not shown in FIG. 4) implements the current inductor current of the converter as an input and the output of the memory unit as another input to output a difference there between. The difference as the output is the current detective signal $I_{sen}$. The current sampling circuit 204 can be an analog to digital converter, an integrator, a resistor and capacitance filter and combination thereof. The first gain circuit 205 is to multiply the current detective signal $I_{sen}$ by a first gain adjusting parameter ($K_{p1}$) to generate a first signal $V_{out1}$ ($V_{out1}=K_{P1}*I_{sen}$, wherein * represents multiply). The differential amplifier 203 includes one end receiving a reference voltage $V_{ref}$ and another end is electrically connected to the feedback voltage $BV_0$ to generate an error signal by comparing the reference voltage $V_{ref}$ and the feedback voltage $BV_0$. The second gain circuit 206 is configured to multiply the error signal $X_a$ by a second gain adjusting parameter $K_{p2}$ to generate a second signal $V_{out2}$ ($V_{out2}=K_{p2}*Xa$, wherein * represents multiply). The adder 207 is configured to weight the first signal $V_{out1}$, the second signal $V_{out2}$ and the feedback voltage $BV_0$ to generate a $V_{out3}$ ($V_{out3}=K_{p1}*I_{sen}+K_{p2}*X_a+BV_0$, wherein * represents multiply). The saw tooth wave generator 208 is configured to provide a ramp signal $V_{ramp}$. The inductor current of the inductor sampled by the current sampling circuit 204 is calculated to generate the current detective signal $I_{sen}$ which is easy to cause sub-harmonic. Therefore, the ramp signal $V_{ramp}$ is added to solve the sub-harmonic problem. The modulation comparator 209 is configured to compare the third signal $V_{out3}$ and the ramp signal $V_{ramp}$ to generate a driving signal $S\_{DR}$. The driver 210 includes one end receiving driving signal $S\_{DR}$ and another end electrically connected to the switch of the converter. The converter can be a MOS transistor, a BJT transistor, an IGBT transistor or any other different kinds of transistors to receive the driving signal from the gate electrode.

When the switch SW of the current control circuit 200 is conducted, the diode D will have a reverse bias to store the power of the input voltage $V_i$ in the inductor L and the inductor current of the inductor L will be increased. The differential amplifier of the current sampling circuit 204 calculates the difference between the present inductor current stored in the inductor and the previous inductor current of the memory unit or the average of the past inductor current of the inductor. The difference as the output is the current detective signal $I_{sen}$. Thereafter, the current detective signal $I_{sen}$ is multiplied by a first gain adjusting parameter ($K_{p1}$) to generate a first signal $V_{out1}$. The output voltage $V_0$ will pass the first resistor and the second resistor of the voltage divider circuit 202 to generate a feedback voltage $BV_0$ (where $B=R_2/(R_1+R_2)$). The feedback voltage $BV_0$ is transmitted to the differential amplifier 203 and compared with the reference voltage $V_{ref}$ to generate an error signal $X_a$. The error signal $X_a$ is multiplied by a second gain adjusting parameter ($K_{p2}$) to generate a second signal $V_{out2}$. Now, the first signal $V_{out1}$ and the second signal $V_{out2}$ are weighted by the adder 207 and the feedback voltage $BV_0$ to generate a third signal $V_{out3}$. At final, the modulation comparator 209 is used to compare the third signal $V_{out3}$ and a ramp signal provided by a saw tooth wave generator 208 to generate a driving signal $S\_{DR}$ and the driving signal $S\_{DR}$ is transmitted to the driver 210 to generate a duty cycle ratio to control conducting or cutting off in the switch of the converter. It should be noted that the Boost converter in the present embodiment is made of an inductor L, a diode D and a switch SW but it is not limited herein. The Boost converter can be made of any inductor L, diode D, a switch SW or any combination thereof in accordance with the practical requirement.

Figure 5:
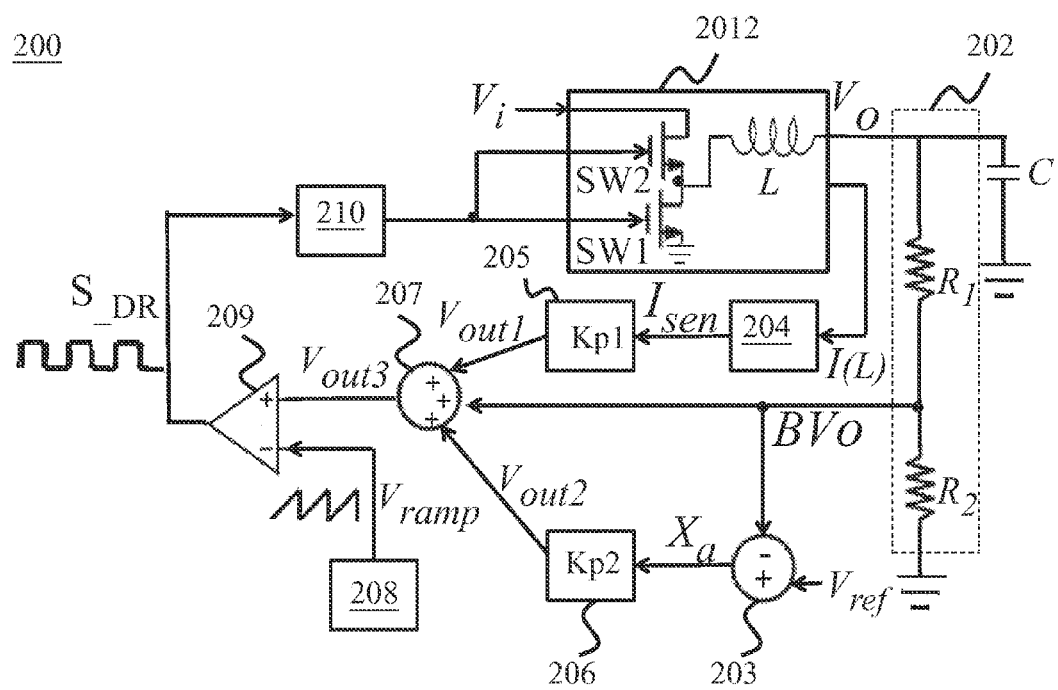
FIG. 5 is a structural view illustrating the current control circuit in a second embodiment of the present invention.

Now, please refer to FIG. 5, which is a structural view illustrating the current control circuit in a second embodiment of the present invention. As shown in FIG. 5, the current control circuit 200 includes a Buck converter 2012, a voltage divider circuit 202, a differential amplifier 203, a current sampling circuit 204, a first gain circuit 205, a second gain circuit 206, an adder 207, a saw tooth generator 208, a modulation comparator 209 and a driver 210. The Buck converter consists of an inductor L, a first switch SW1 and a second switch SW2 and configured to receive and convert an input voltage $V_i$ to generate an output voltage Vo to a capacitance C. A voltage divider circuit 202 is electrically connected to the capacitance C and generates a feedback voltage $BV_0$ (where $B=R_2/(R_1+R_2)$) in accordance with the output voltage of the converter. The voltage divider circuit 202 includes a first resistor $R_1$ electrically connected to the output voltage $V_0$ and a second resistor $R_2$ electrically connected between the first resistor and a ground. A connective point between the first resistor $R_1$ and the second resistor $R_2$ is electrically connected to a differential amplifier 203. The feedback voltage $BV_0$ is obtained from the connective point between the first resistor and the second resistor. The current sampling circuit 204 implementing a current detective unit (not shown in FIG. 5) to sample the inductor current of the converter and the current sampling circuit 204 will generate a current detecting signal $I_{sen}$ after internal calculating. The current sensing unit can sample the inductor current of the converter in accordance with a series resistor, a resistor and capacitance filter, a sensing resistor, a conductive resistor or a sensing transistor. The current sampling circuit 204 further includes a memory unit (not shown in FIG. 5) configured to memorize an inductor current of the previous inductor current of the converter or the average of the past inductor current of the inductor. The differential amplifier (not shown in FIG. 5) implements the current inductor current of the converter as an input and the output of the memory unit as another input to output a difference there between. The difference as the output is the current detective signal $I_{sen}$. The current sampling circuit 204 can be an analog to digital converter, an integrator, a resistor and capacitance filter and combination thereof. The first gain circuit 205 is to multiply the current detective signal $I_{sen}$ by a first gain adjusting parameter ($K_{p1}$) to generate a first signal $V_{out1}$ ($V_{out1}=K_{p1}*I_{sen}$, wherein * represents multiply). The differential amplifier 203 includes one end receiving a reference voltage $V_{ref}$ and another end is electrically connected to the feedback voltage $BV_0$ to generate an error signal $X_a$ by comparing the reference voltage $V_{ref}$ and the feedback voltage $BV_0$. The second gain circuit 206 is configured to multiply the error signal $X_a$ by a second gain adjusting parameter ($K_{p2}$) to generate a second signal $V_{out2}$ ($V_{out2}=K_{p2}*X_a$, wherein * represents multiply). The adder 207 is configured to weight the first signal $V_{out1}$, the second signal $V_{out2}$ and the feedback voltage $BV_0$ to generate a $V_{out3}$ ($V_{out3}=K_{p1}*I_{sen}+K_{p2}*X_a+BV_0$, wherein * represents multiply). The saw tooth wave generator 208 is configured to provide a ramp signal $V_{ramp}$. The inductor current of the inductor sampled by the current sampling circuit 204 is calculated to generate the current detective signal $I_{sen}$ which is easy to cause sub-harmonic. Therefore, the ramp signal $V_{ramp}$ is added to solve the sub-harmonic problem. The modulation comparator 209 is configured to compare the third signal $V_{out3}$ and the ramp signal $V_{ramp}$ to generate a driving signal $S_{\_DR}$. The driver 210 includes one end receiving driving signal $S_{\_DR}$ and another end electrically connected to the switch of the converter to generate a duty cycle ratio. The converter can be a MOS transistor, a BJT transistor, an IGBT transistor or any other different kinds of transistors to receive the driving signal $S_{\_DR}$ from the gate electrode.

When the switch SW of the current control circuit 200 is conducted, the inductor current of the inductor L will be increased and the current sampling circuit 204 will sample the inductor current of the inductor. The differential amplifier of the current sampling circuit 204 calculates the difference between the present inductor current stored in the inductor and the previous inductor current of the memory unit or the average of the past inductor current of the inductor. The difference as the output is the current detective signal $I_{sen}$. Thereafter, the current detective signal $I_{sen}$ is multiplied by a first gain adjusting parameter ($K_{p1}$) to generate a first signal $V_{out1}$. The output voltage $V_0$ will pass the first resistor and the second resistor of the voltage divider circuit 202 to generate a feedback voltage $BV_0$ (where $B=R_2/(R_1+R_2)$). The feedback voltage $BV_0$ is transmitted to the differential amplifier 203 and compared with the reference voltage $V_{ref}$ to generate an error signal $X_a$. The error signal $X_a$ is multiplied by a second gain adjusting parameter ($K_{p2}$) to generate a second signal $V_{out2}$. Now, the first signal $V_{out1}$ and the second signal $V_{out2}$ are weighted by the adder 207 and the feedback voltage $BV_0$ to generate a third signal $V_{out3}$. At final, the modulation comparator 209 is used to compare the third signal $V_{out3}$ and a ramp signal provided by a saw tooth wave generator 208 to generate a driving signal $S_{\_DR}$ and the driving signal $S_{\_DR}$ is transmitted to the driver 210 to generate a duty cycle ratio to control close or cut off condition in the switch of the converter. It should be noted that The Buck converter in the present embodiment is made of an inductor L, a first switch SW1 and a second switch SW2 but it is not limited herein. The Buck converter can be made of any inductor L, diode D, a switch SW or any combination thereof in accordance with the practical requirement.

Figure 6:
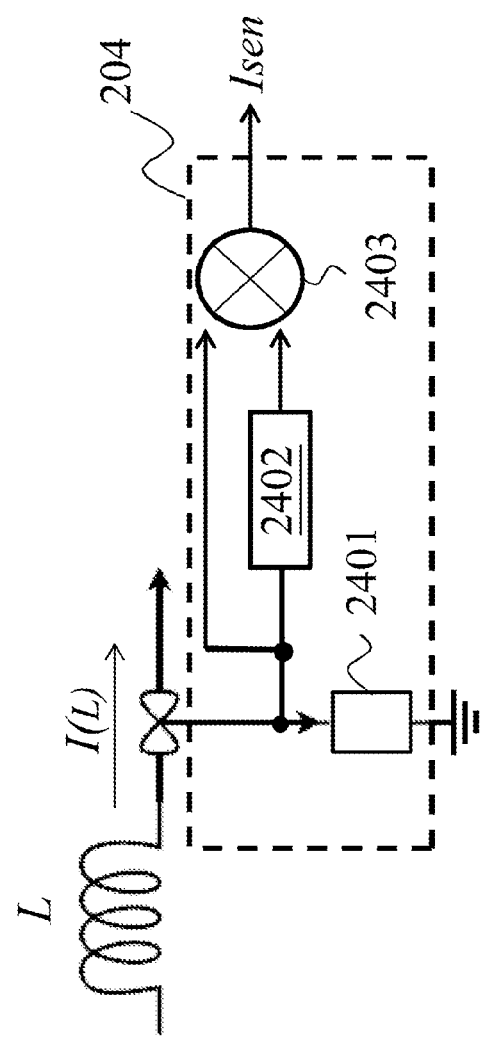
FIG. 6 is a structural view illustrating the current control circuit in a second embodiment of the present invention.

Now, please refer to FIG. 6, which is a structural view illustrating the current control circuit in a second embodiment of the present invention. As shown in FIG. 6, the current control circuit 200 includes a current detective unit 2401, a memory unit 2402 and a differential amplifier 2403. The current sensing unit 2401 is configured to sample the inductor current of the inductor of the converter. The current sensing unit 2401 is to sample the inductor current of the inductor by a series resistor, a resistor, and capacitance filter, a sensing resistor, a conductive resistor or a sensing transistor. The memory unit 2402 is configured to memorize the previous inductor current of the converter or the average of the past inductor current of the converter. The differential amplifier 2403 implements the current inductor current of the converter as an input and the output of the memory unit 2402 as another input to output a difference. When the transistor switch (SW) is conducted, the current of the input voltage $V_i$ is forward to the inductor L and the inductor current of the inductor L will be increased. The current sensing unit samples the inductor current of the inductor L and the differential amplifier 2303 of the current sampling circuit 204 will calculate a difference of the current inductor current of the inductor and the previous inductor current of the inductor with the memory unit or the average of the past inductor current of the inductor and output the difference. The difference as the output is the current detecting signal $I_{sen}$. The current sampling circuit of the present invention is selected from an analog to digital converter, a sampling and maintaining circuit, an integrator, a resistor and capacitance filter and combination thereof.

Figure 7:
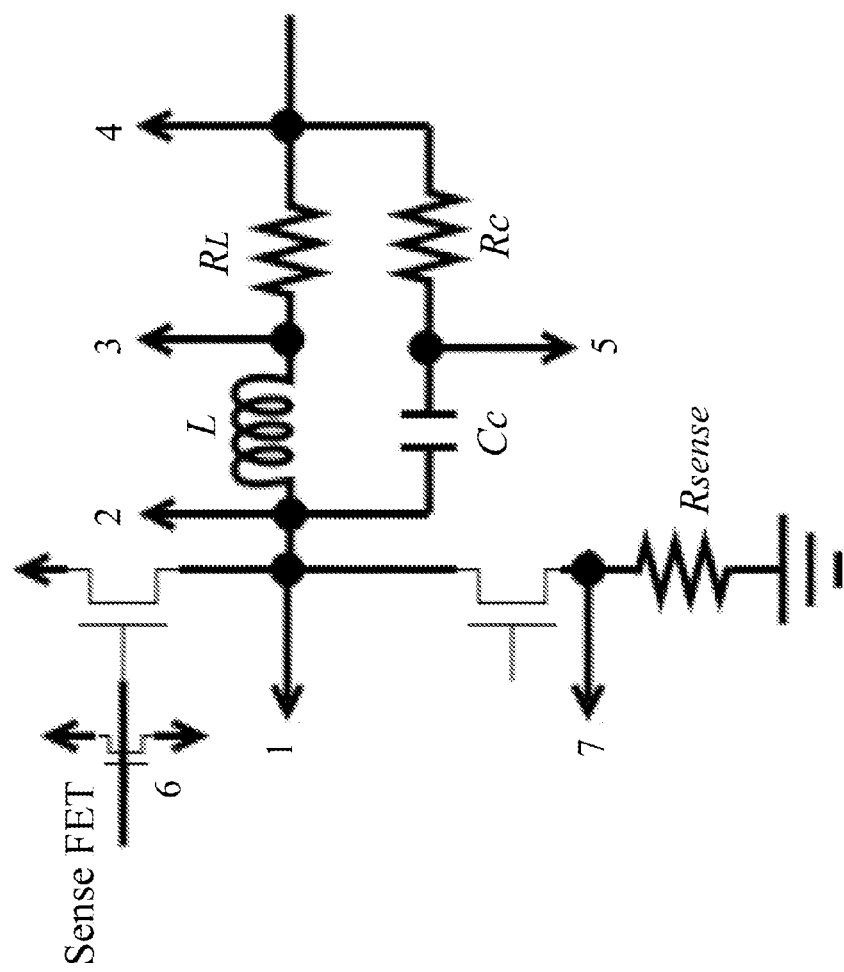
FIG. 7, which is a view illustrating the inductor current sampled by the current sensing unit in the present invention.

Please refer to FIG. 7, which is a view illustrating the inductor current sampled by the current sensing unit in the present invention. According to the description above, when the switch SW of the current control circuit 200 is conducted, the inductor current stored in the inductor L will be increased and the current sampling circuit 204 will sample the inductor current of the inductor. The differential amplifier of the current sampling circuit 204 calculates the difference between the present inductor current of the inductance and the previous inductor current of the memory unit or the average of the past inductor current of the inductor. The difference as the output is the current detective signal $I_{sen}$. The current sensing unit can sample the inductor current of the converter by a series resistor ($R_L$), a resistor and capacitance filter ($R_C$, $C_C$), a sensing resistor ($R_{sense}$), a conductive resistor ($R_{ds}$) or a sensing transistor (sense FET). As shown in FIG. 7, the first method is to connect the series resistor ($R_L$) and the inductor L in serial and measure the value between the node 3 and node 4 in two ends of the capacitance ($C_C$) to obtain the inductor current of the inductor. The second method is to implement the resistor and capacitance filter ($R_C$, $C_C$) to measure the value of the node 7 to obtain the inductor current of the inductor. The fourth method is to implement the conductive resistor ($R_{ds(on)}$) to measure the value in node 1 when the transistor switch is conducted to obtain the inductor current of the inductor. The fifth method is to add an additional sensing transistor (sense FET) to measure the value in node 6 to obtain the inductor current of the inductor.

Figure 8:
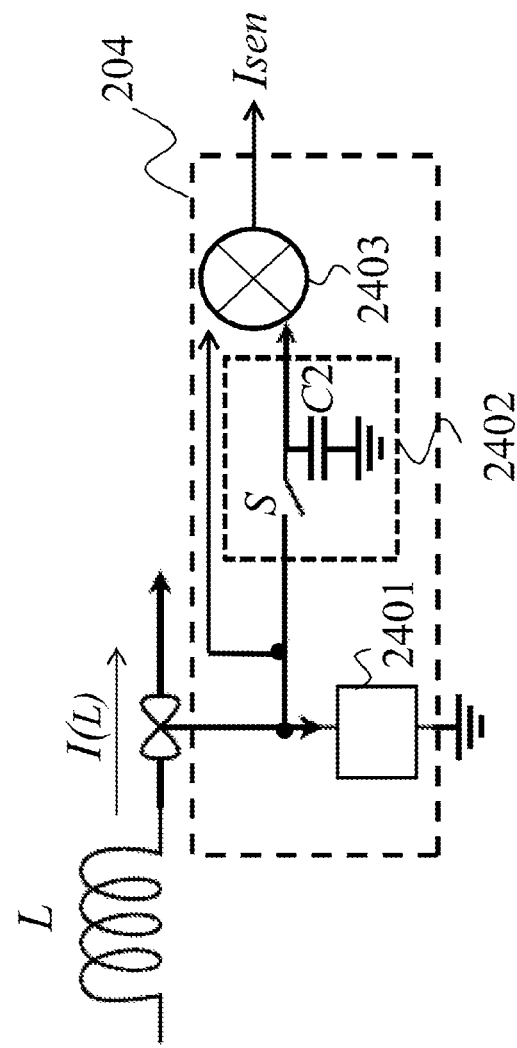
FIG. 8 is a view illustrating the current sampled by the sampling and maintaining circuit in the present invention.

Please refer to FIG. 8, which is a view illustrating the current sampled by the sampling and maintaining circuit in the present invention. As shown in FIG. 8, the current control circuit 200 includes a current detective unit 2401, a memory unit 2402 and a differential amplifier 2403. The current sensing unit 2401 is configured to sample the inductor current of the inductor L of the converter. The current sensing unit 2401 is to sample the inductor current of the inductor by a series resistor, a resistor and capacitance filter, a sensing resistor, a conductive resistor or a sensing transistor. The memory unit 2402 is configured to memorize the previous inductor current of the inductor L or the pass inductor current of the inductor L. The memory unit 2402 is a sampling and maintaining circuit and includes a component for storing power (C2) and a switch (S) controlling signal in and out. The differential amplifier 2403 implements the current inductor current of the inductor L as an input and the output of the memory unit 2402 as another input to calculate a difference to output a current sensing signal $I_{sen}$. After the current is passing the inductor L and sampled by the current sensing unit of the current sampling circuit 204, the component for storing power (C2) and the switch (S) within the sampling and maintaining circuit are used to memorize the inductor current. When the switch (S) to control signal in and out in the sampling and maintaining circuit is conducted, the component for storing power (C2) will memorize the inductor current of the inductor L before the switch (S) is going to cut off. The differential amplifier 2303 will calculate a difference of the current inductor current of the inductor L and the previous inductor current of the inductor with the memory unit or the average of the past inductor current of the inductor and output the difference. The difference as the output is the current detecting signal $I_{sen}$.

Figure 9:
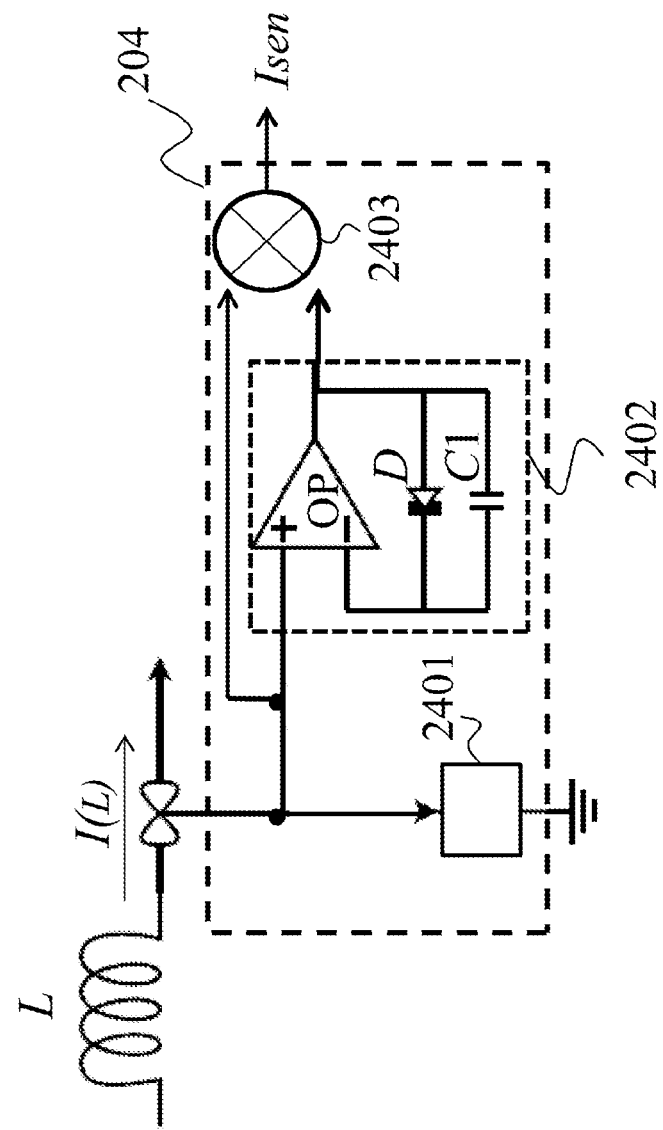
FIG. 9 is a view illustrating the current sampled by the integrator in the present invention.

Please refer to FIG. 9, which is a view illustrating the current sampled by the integrator in the present invention. According to the description above, when the switch SW of the current control circuit 200 is conducted, the inductor current of the inductor L will be increased and the current sampling circuit 204 will sample the inductor current stored in the inductor. The differential amplifier of the current sampling circuit 204 calculates the difference between the present inductor current of the inductor and the previous inductor current of the memory unit or the average of the past inductor current of the inductor. The difference as the output is the current detective signal $I_{sen}$. The current sampling circuit of the present invention is selected from an analog to digital converter, a sampling and maintaining circuit, an integrator, a resistor and capacitance filter and combination thereof. The present embodiment is to implement the integrator to sample inductor current. As shown in FIG. 9, the current sampling circuit 204 includes a current detective unit 2401, a memory unit 2402 and a differential amplifier 2403. The current sensing unit 2401 is configured to sample the inductor current of the inductor L. The current sensing unit 2401 is to sample the inductor current of the inductor by a series resistor ($R_L$), a resistor and capacitance filter ($R_C$, $C_C$), a conductive resistor ($R_{ds}$) or a sensing transistor (sense FET). The memory unit 2402 is configured to memorize the previous inductor current of the inductor L or the past inductor current of the inductor L. The memory unit 2402 is an integrator and includes an operation amplifier (OP) having a positive input point connected with the current sensing unit and a negative input point connected with a diode D. When the diode D is in forward bias or reverse bias, the capacitance C1 connected with the negative input end of the OP is in charging or discharging. When the diode D is in reverse bias, the power within the capacitance C1 is converted and the power within the capacitance is the inductor current. The differential amplifier 2303 will calculate a difference of the current inductor current of the inductor L and the previous inductor current stored in the capacitance C1 and output the difference. The difference as the output is the current detecting signal $I_{sen}$ for the following gain process.

Figure 10:
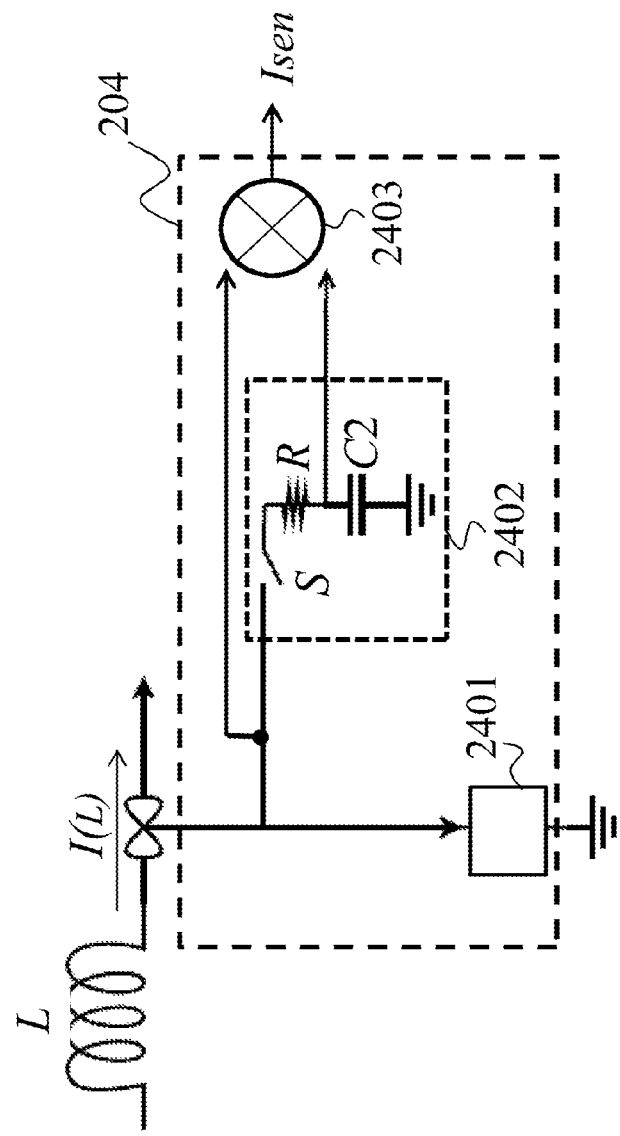
FIG. 10 is a view illustrating the current sampled by the sampling and maintaining circuit and the resistor and capacitance filter in the present invention.

Please refer to FIG. 10, which is a view illustrating the current sampled by the sampling and maintaining circuit and the resistor and capacitance filter in the present invention. According to the description above, when the switch SW of the current control circuit 200 is conducted, the inductor current of the inductor L will be increased and the current sampling circuit 204 will sample the inductor current stored in the inductor. The differential amplifier of the current sampling circuit 204 calculates the difference between the present inductor current of the inductor and the previous inductor current of the memory unit or the average of the past inductor current of the inductor. The difference as the output is the current detective signal $I_{sen}$. The current sampling circuit of the present invention is selected from an analog to digital converter, a sampling and maintaining circuit, an integrator, a resistor and capacitance filter and combination thereof. The present embodiment is to implement the sampling and maintaining circuit and the resistor and capacitance circuit to sample inductor current. As shown in FIG. 10, the current sampling circuit 204 includes a current detective unit 2401, a memory unit 2402 and a differential amplifier 2403. The current sensing unit 2401 is configured to sample the inductor current of the inductor L. The current sensing unit 2401 is to sample the inductor current of the inductor by a series resistor ($R_L$), a resistor and capacitance filter ($R_C$, $C_C$), a conductive resistor ($R_{ds}$) or a sensing transistor (sense FET). The memory unit 2402 is configured to memorize the previous inductor current of the inductor L or the past inductor current of the inductor L. The memory unit 2402 is made of a sampling and maintaining circuit and a resistor and capacitance filter. Among these elements, the resistor and capacitance filter is made of a component for storing power (C2) and a resistor. Then a switch (S) within the sampling and maintaining circuit are used to memorize the inductor current. The differential amplifier 2403 implements the current inductor current of the inductor L as an input and the output of the memory unit 2402 as another input to calculate a difference to output a current sensing signal $I_{sen}$. The differential amplifier 2403 will calculate a difference of the current inductor current of the inductor L and the previous inductor current of the inductor with the memory unit or the average of the past inductor current of the inductor and output the difference. After the current is passing the inductor L and sampled by the current sensing unit of the current sampling circuit 204, the component for storing power (C2) and the switch (S) within the sampling and maintaining circuit are used to memorize the inductor current. When the switch (S) to control signal in and out in the sampling and maintaining circuit is conducted, the component for storing power (C2) will memorize the inductor current of the inductor L before the switch (S) is going to cut off. The differential amplifier 2403 will calculate a difference of the current inductor current of the inductor L and the previous inductor current of the inductor with the memory unit or the average of the past inductor current of the inductor and output the difference. The difference as the output is the current detecting signal $I_{sen}$.

Figure 11:
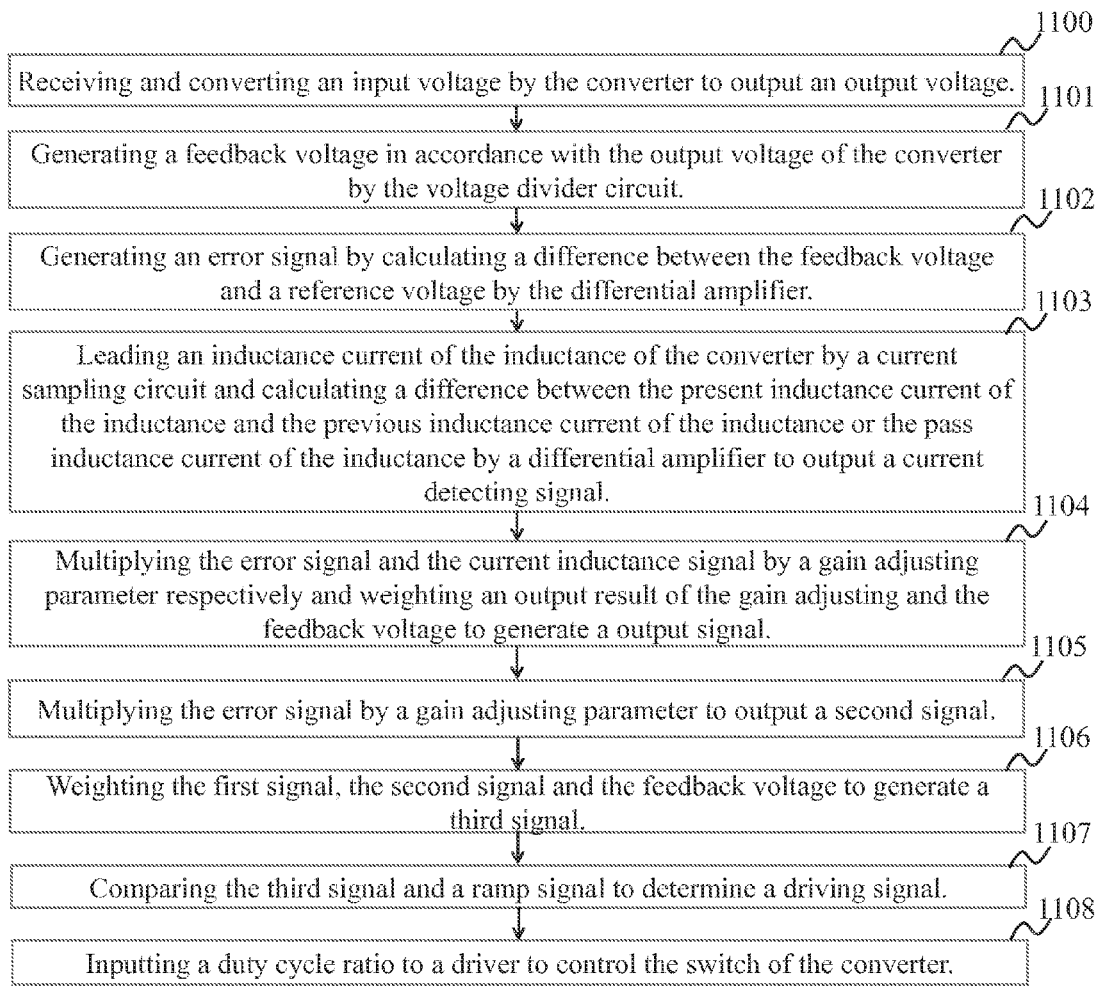
FIG. 11 is a flowchart illustrating the current control method in the present invention.

At final, please refer to FIG. 11, which is a flowchart illustrating the current control method in the present invention. As shown in FIG. 11, the current control method of the current control circuit is used in a power converter. The current control circuit includes a converter, a voltage divider circuit, a current sampling circuit, a differential amplifier, a modulation comparator and a driver connected to the modulation comparator. The current control method includes the following steps:

Step 1100: receiving an input voltage by the converter to convert and output an output voltage; it is configured to receive and convert an input voltage $V_i$ to output an output voltage $V_0$. The converter includes an inductor L, a switch SW and a diode D, and it is going to step 1101.

Step 1101: generating a feedback voltage in accordance with the output voltage of the converter by the voltage divider circuit; it is to implement the converter to convert the output voltage $V_0$ to generate a feedback voltage $BV_0$ (where $B=R_2/(R_1+R_2)$). The voltage divider circuit includes a first resistor $R_1$ and a second resistor R2. The feedback voltage $BV_0$ is obtained from a connective point between the first resistor $R_1$ and the second resistor $R_2$, and it is going to step 1102.

Step 1102: generating an error signal in accordance an error between the feedback voltage and a reference voltage calculated by the differential amplifier; it is to implement the differential amplifier and one end thereof to receive a reference voltage $V_{ref}$ and another end thereof is electrically connected to the feedback voltage $BV_0$. The error signal $X_a$ is generated by comparing the reference voltage $V_{ref}$ and the feedback voltage $BV_0$, and it is going to step 1103.

Step 1103: Sampling an inductor current of the inductor of the converter by a current sampling circuit and calculating a difference between the present inductor current of the inductor and the previous inductor current of the inductor or the past inductor current of the inductance by a differential amplifier to output a current detecting signal; it is to use the inductor current of the inductor of the converter. The differential amplifier will calculate a difference of the current inductor current of the inductor L and the previous inductor current of the inductor with the memory unit or the average of the past inductor current of the inductor and output the current detecting signal. The converter is selected from an analog to digital converter, a sampling and maintaining circuit, an integrator, a resistor and capacitance filter and combination thereof, and it is going to step 1104.

Step 1104: multiplying the error signal and the current inductor signal by a gain adjusting parameter and weighting an output result of the gain adjusting and the feedback voltage to generate a output signal; it is to multiply the current sensing signal $I_{sen}$ by a gain adjusting parameter ($K_{p1}$) to generate a first signal $V_{out1}$ ($V_{out1}=K_{p1}*I_{sen}$, wherein * means multiply), and it is going to step 1105.

Step 1105: multiplying the error signal by a gain adjusting parameter to output a second signal; it is to multiply the error signal $X_a$ by a gain adjusting parameter ($K_{p2}$) to generate a second signal $V_{out2}$ ($V_{out2}=K_{p2}*X_a$, wherein * means multiply), and it is going to step 1106.

Step 1106: weighting the first signal, the second signal and the feedback voltage to generate a third signal; it is to implement an adder to weight the first signal $V_{out1}$ (where $V_{out1}=K_{p1}*I_{sen}$), the second signal $V_{out2}$ ($V_{out2}=K_{p2}*X_a$) and the feedback signal $BV_0$ (where $B=R_2/(R_1+R_2)$) to generate a third signal $V_{out3}=K_{p1}*I_{sen}+K_{p2}*X_a+BV_0$, and it is going to step 1107.

Step 1107: comparing the third signal and a ramp signal to determine a driving signal; it is to implement a modulation comparator to compare the third signal $V_{out3}$ (where $V_{out3}=K_{p1}*I_{sen}+K_{p2}*X_a+BV_0$) and a ramp signal $V_{ramp}$ generated by a saw tooth wave generator, and it is going to step 1108.

Step 1108: inputting a duty cycle ratio to a driver to control the switch of the converter; one end of the driver is to receive the driving signal $S_{\_DR}$ generated by the modulation comparator and another end thereof is connected to the switch SW of the converter to generate a duty cycle ratio to control the switch SW. The switch SW is a MOS (Metal Oxide Semiconductor Field Effect Transistor) transistor, a BJT (Bipolar Junction Transistor) transistor, IGBT (Insulated Gate Bipolar Transistor) transistor or any other different types of transistor and the gate electrode thereof is to receive the driving signal $S_{\_DR}$.

Although specific embodiments have been illustrated and described, it will be appreciated by those skilled in the art that various modifications may be made without departing from the scope of the present invention, which is intended to be limited solely by the appended claims.

What is claimed is:

1. A current control circuit for a power converter, comprising:
   a converter including at least one inductor and at least one switch and configured to receive an input voltage and generate a output voltage to a capacitance;
   a voltage divider circuit electrically connected to the capacitance and generating a feedback voltage in accordance with the output voltage of the converter;
   a current sampling circuit electrically connected to the converter and configured to generate a current detecting signal in accordance with the inductor current of the inductor of the converter;
   a first gain circuit configured to multiply the current detecting signal by a first gain adjusting parameter to generate a first signal;
   a differential amplifier including one end receiving a reference voltage and the other end electrically connected to the feedback voltage and output an error signal by comparing the reference voltage and the feedback voltage;

a second gain circuit configured to multiply the error signal by a second gain adjusting parameter to generate a second signal;

an adder weighting the first signal, the second signal and the feedback voltage to generate a third signal;

a saw tooth wave generator configured to provide a ramp signal;

a modulation comparator comparing the third signal and the ramp signal to generate a driving signal; and a driver including one end receiving the driving signal and the other end electrical connected to the switch within the converter and configured to generate a duty cycle ratio to control the switch.

2. The current control circuit for the power converter of claim 1, wherein the converter further includes a diode.

3. The current control circuit for the power converter of claim 1, wherein the converter is a Boost converter, a Buck converter, a Boost-Buck converter and combination thereof.

4. The current control circuit for the power converter of claim 1, wherein the switch is selected from a group consisting of MOS transistor, BJT transistor, IGBT transistor and combination thereof.

5. The current control circuit for the power converter of claim 1, wherein the current sampling circuit is selected from one of the following items: an analog to digital converter, a sampling and maintaining circuit, an integrator, and a resistor and capacitance filter, or combination thereof.

6. The current control circuit for the power converter of claim 1, wherein voltage divider circuit comprises:
   a first resistor electrically connected to the output voltage; and
   a second resistor connected between the first resistor and the ground;
   wherein a connective point between the first resistor and the second resistor is also electrically connected to the differential amplifier.

7. The current control circuit for the power converter of claim 1, wherein the feedback voltage is obtained by the connective point of the first resistor and the second resistor.

8. A current control method of a current control circuit for a power converter, the current control circuit including a converter, a voltage divider circuit, a current sampling circuit, a differential amplifier, a modulation comparator, and a driver connected to the modulation comparator and the current control method comprising steps of:
   receiving and converting an input voltage by the converter to output an output voltage;
   generating a feedback voltage in accordance with the output voltage of the converter by the voltage divider circuit;
   generating an error signal by calculating a difference between the feedback voltage and a reference voltage by the differential amplifier;
   sampling an inductor current of the inductor of the converter by a current sampling circuit and calculating a difference between the present inductor current of the inductor and the previous inductor current of the inductor or the past inductor current of the inductor by a differential amplifier to output a current detecting signal;
   adding the error signal and the current inductor signal by a gain adjusting parameter respectively and weighting an output result of the gain adjusting and the feedback voltage to generate a output signal;
   comparing the output signal and a ramp signal of a saw tooth wave generator by the modulation comparator; and generating a duty cycle ratio by inputting a driving signal of the modulation comparator in the driver and controlling the switch of the converter.

9. The current control method for the power converter of claim 8, wherein the converter includes at least one inductor, at least one diode, or at least one switch.

10. The current control method for the power converter of claim 8, wherein the converter is a Boost converter, a Buck converter, a Boost-Buck converter and combination thereof.

11. The current control method for the power converter of claim 8, wherein the switch is selected from a group consisting of MOS transistor, BJT transistor, IGBT transistor, and combination thereof.

12. The current control circuit for the power converter of claim 8, wherein voltage divider circuit comprises:
   a first resistor electrically connected to the output voltage; and
   a second resistor connected between the first resistor and the ground;
   wherein a connective point between the first resistor and the second resistor is also electrically connected to the differential amplifier.

13. The current control method for the power converter of claim 12, wherein the feedback voltage is obtained by the connective point of the first resistor and the second resistor.

14. The current control method for the power converter of claim 8, wherein the current sampling circuit is selected from a group consisting of an analog to digital converter, a sampling and maintaining circuit, an integrator, a resistor, and a capacitance filter, or combination thereof.

15. A current control circuit for a power converter (200), comprising:
   a converter (201) including at least one inductor and at least one switch and configured to receive an input voltage and generate a output voltage to a capacitance;
   a voltage divider circuit (202) electrically connected to the capacitance and generating a feedback voltage in accordance with the output voltage of the converter;
   a current sampling circuit (204) electrically connected to the converter and configure to generate a current detecting signal in accordance with the inductor current of the inductor of the converter;
   a first gain circuit (205) configured to multiply the current detecting signal by a first gain adjusting parameter to generate a first signal;
   a differential amplifier including one end receiving a reference voltage and one other end electrically connected to the feedback voltage and output an error signal by comparing the reference voltage and the feedback voltage;
   a second gain circuit (206) configured to multiply the error signal by a second gain adjusting parameter to generate a second signal;
   an adder (207) weighting the first signal, the second signal, and the feedback voltage to generate a third signal;
   a saw tooth wave generator (208) configured to provide a ramp signal;
   a modulation comparator (209) comparing the third signal and the ramp signal to generate a driving signal; and
   a driver (210) including one end receiving the driving signal and the other end electrically connected to the switch within the converter and configured to generate a duty cycle ratio to control the switch;
   wherein the current sampling circuit comprises:
      a current sensing unit configured to sample an inductor current of the converter;

a memory unit configured to memorize an inductor current of the previous inductor current of the converter or the average of the past inductor current of the converter; and a differential amplifier implementing the present inductor current of the converter as an input and the output of the memory unit as another input to output a difference there between.

16. The current control circuit for the power converter of claim 15, wherein the current sampling circuit is selected from a group consisting of an analog to digital converter, a sampling and maintaining circuit, integrator, a resistor, and a capacitance filter or combination thereof.

* * * * *